(12) United States Patent
Siddam et al.

(10) Patent No.: US 8,644,337 B2
(45) Date of Patent: Feb. 4, 2014

(54) AUTHORIZING QOS PER QCI

(75) Inventors: Kalyan Premchand Siddam, Ottawa (CA); Fernando Cuervo, Ottawa (CA)

(73) Assignee: Alcatel Lucent, Paris (FR)

( * ) Notice: Subject to any disclaimer, the term of this patent is extended or adjusted under 35 U.S.C. 154(b) by 460 days.

(21) Appl. No.: 12/826,397

(22) Filed: Jun. 29, 2010

(65) Prior Publication Data

US 2011/0317718 A1 Dec. 29, 2011

(51) Int. Cl.
*H04J 3/16* (2006.01)

(52) U.S. Cl.
USPC .......................................... 370/468; 370/235

(58) Field of Classification Search
USPC .................. 370/468, 477, 229–235, 395.21, 370/395.41; 709/223–226, 229, 233
See application file for complete search history.

(56) References Cited

U.S. PATENT DOCUMENTS

| | | | |
|---|---|---|---|
| 2009/0190471 A1* | 7/2009 | Mahendran et al. | 370/230.1 |
| 2011/0239273 A1* | 9/2011 | Yang et al. | 726/3 |
| 2011/0320620 A1* | 12/2011 | Cutler et al. | 709/229 |
| 2011/0320622 A1* | 12/2011 | Cutler et al. | 709/230 |
| 2012/0144049 A1* | 6/2012 | Lopez Nieto et al. | 709/228 |

OTHER PUBLICATIONS

3GPP TS 23.203, "3rd Generation Partnership Project; Technical Specification Group Services and System Aspects; Policy and Charging Control Architecture (Release 8)", v. 8.1.1, 2008.
ETSI TS 129 213, "Digital Cellular Telecommunications System (Phase 2+); Universal Mobile Telecommunications System (UMTS); LTE; Policy and Charging Control Signalling Flows and Quality of Service (QoS) Parameter Mapping (3GPP TS 29.213 version 9.2.0 Release 9)", 2010.
ETSI TS 129 212, "Universal Mobile Telecommunications System (UMTS); LTE; Policy and Charging Control Over Gx Reference Point (3GPP TS 29.212 version 9.2.0 Release 9)", 2010.
ETSI TS 129 214, "Universal Mobile Telecommunications System (UMTS); LTE; Policy and Charging Control Over Rx Reference Point (3GPP TS 29.214 version 9.3.0 Release 9)", 2010.

* cited by examiner

*Primary Examiner* — Gary Mui

(74) *Attorney, Agent, or Firm* — Kramer & Amado P.C

(57) ABSTRACT

The invention is directed to 3GPP-compliant networks wherein a Policy and Charging Rules Function (PCRF) node provides a subscriber's maximum allowed Authorized Quality-of-Service (QoS) per QoS Class Identifier (QCI) to a Policy and Charging Enforcement Function (PCEF) as the authorized QoS per QCI, such that the PCEF node can then allocate resources and bandwidth over one or more Internet Protocol Connectivity Access Network (IP-CAN) bearers with the same QCI.

16 Claims, 4 Drawing Sheets

Time : t

Time : t+1

Time : t+2

AUTHORIZING QOS PER QCI

FIELD OF THE INVENTION

The invention is directed to packet switching communication networks, and in particular to authorizing Quality of Service (QoS) in a Long Term Evolution (LTE) network.

BACKGROUND OF THE INVENTION

Long Term Evolution (LTE) is a new network scheme recommended by the 3rd Generation Partnership Project (3GPP). In an LTE network, all communications are carried over an IP channel from user equipment (UE) to an all-IP core called the Evolved Packet Core (EPC). The EPC then provides gateway access to other networks while ensuring an acceptable Quality of Experience (QoE) and charging a subscriber for their particular network activity.

The 3GPP generally describes the components of the EPC and their interactions with each other in a number of technical specifications. Specifically, 3GPP TS 23.203, 3GPP TS 29.212, 3GPP TS 29.213, and 3GPP TS 29.214 describe the Policy and Charging Rules Function (PCRF), Policy and Charging Enforcement Function (PCEF), and Bearer Binding and Event Reporting Function (BBERF) of the EPC. These specifications further provide some guidance as to how these elements interact in order to provide reliable data services and charge subscribers for use thereof. The 3GPP specification allows the Policy and Charging Control (PCC) architecture to interwork with older generation networks (e.g., General Packet Radio Service (GPRS)). For example, 3GPP TS 29.212 and 3GPP TS 29.214 provide some guidance on the establishment of an application session by the EPC upon receipt of an application request from an Application Function (AF) in the form of an AA-Request (AAR) message or from a Packet Data Network Gateway (PGW) in the form of a Credit Control Request (CCR) message. The standards specify that the PCRF is responsible for receiving new service requests, creating new PCC rules commensurate with such requests, and providing these new PCC rules to a Policy and Charging Enforcement Function (PCEF) for installation. The 3GPP standards also define the format of service request messages and PCC rules.

The 3GPP specifications suggest that the PCRF-provided authorized QoS at the Internet Protocol Connectivity Access Network (IP-CAN) bearer level, at the QoS Class Identifier (QCI) level and the service flow level. The 3GPP specifications further specify that the level at which the PCRF provides the authorized QoS is based on the bearer control mode—if PCRF or PCEF is responsible for the PCC rule binding—a process of which a PCC rule is bound to a specific IP-CAN bearer. As per the 3GPP specifications, the PCRF provides the authorized QoS at the IP-CAN bearer level when the PCRF does bearer binding (i.e., Bearer control mode is UE-only), and provides the authorized QoS at the QCI level when the PCEF does bearer binding (i.e., Bearer control model is UE_NW). The authorized QoS at the service flow level is provided by the PCRF in both bearer control modes.

The 3GPP specification suggests that the provisioned authorized QoS per QCI applies independently to all IP-CAN bearers with the same QCI, currently active, within the same IP-CAN session. This 3GPP-suggested method provides inefficiencies as the PCRF may not have a complete view of the active IP-CAN bearers at the PCEF or the PCC rule(s) currently bound to them. The problem relates to authorizing QoS per QCI in the mixed mode operation (i.e., Bearer control mode is UE_NW). As per the 3GPP specifications, the Policy and Charging Rules Function (PCRF) may provide Authorized QoS per QCI for the non Guaranteed Bit-Rate (GBR) IP-CAN bearers, when the PCEF performs bearer binding.

Therefore, a more efficient means of managing resources and distribution of bandwidth in an LTE system is highly desirable.

SUMMARY OF THE INVENTION

In embodiments of the present invention, the PCRF provides a subscriber's maximum allowed QoS per QCI to the PCEF as the authorized QoS per QCI. The PCEF with the knowledge of the maximum allowed QoS per QCI efficiently manage its resources and the distribution of the bandwidth over one or more IP-CAN bearers with the same QCI.

One aspect of the present invention is directed to a method of providing an Authorized Quality-of-Service (QoS) per QoS Class Identifier (QCI). The method comprises steps of: receiving a service request for a subscriber, the service request comprising a requested bandwidth; retrieving from a Subscription Profile Repository (SPR), a subscriber profile for the subscriber; extracting a QCI limit from the subscriber profile; optionally determining if currently-used bandwidth for active IP-Can bearers within the IP-CAN session of the subscriber plus the requested bandwidth is less than or equal to the QCI limit; responsive to the determining step, provisioning authorized QoS per QCI as the QCI limit In some embodiments of the invention the authorized QoS per QCI is communicated to a Policy and Charging Enforcement Function (PCEF).

In some embodiments of the invention the PCEF may allocate required resources among Internet Protocol Connectivity Access Network (IP-CAN) bearers within an IP-CAN session of the subscriber to provide the authorized QoS.

Some embodiments of the invention further comprise a step of installing one or more charging rules within the IP-CAN session.

Some embodiments of the invention the further comprise a step of sending a Credit Control Answer (CCA) message in response to the service request.

Some embodiments of the invention the further comprise a step of sending a Re-Authorization Request (RAR) message due to a PCRF internal trigger or service request from AF.

In some embodiments of the invention the service request for a subscriber is received in the form of a Credit Control Request (CCR) message.

In some embodiments of the invention the method is performed at a Policy and Charging Rules Function (PCRF) node.

In some embodiments of the invention the PCRF node is a node or nodes providing PCRF functionality.

In some embodiments of the invention the PCRF node comprises an element in a 3GPP-compliant packet data network.

In some embodiments of the invention the 3GPP-compliant packet data network comprises a Long Term Evolution (LTE) or General Packet Radio Service (GPRS) network.

Another aspect of the present invention is directed to a Policy and Charging Rules Function (PCRF) Node for generating Policy and Control Charging PCC rules, the PCRF node configured to: receive a service request for a subscriber, the service request comprising a requested bandwidth; retrieve from a Subscription Profile Repository (SPR), a subscriber profile for the subscriber; extract a QCI limit from the subscriber profile; determine if currently-used bandwidth for active IP-Can bearers within the IP-CAN session of the subscriber plus the requested bandwidth is less than the QCI limit; and responsive to the determining step, provision authorized QoS per QCI as the QCI limit.

Another aspect of the present invention is directed to a machine-readable storage medium encoded with instructions for a policy and rules charging function (PCRN) node, the machine-readable storage medium comprising: instructions for receiving a service request for a subscriber, the service request comprising a requested bandwidth; instructions for retrieving from a Subscription Profile Repository (SPR), a subscriber profile for the subscriber; instructions for extracting a QCI limit from the subscriber profile; instructions for determining if currently-used bandwidth for active IP-Can bearers within the IP-CAN session of the subscriber plus the requested bandwidth is less than the QCI limit; instructions for, responsive to the determining step, provisioning authorized QoS per QCI as the QCI limit.

BRIEF DESCRIPTION OF THE DRAWINGS

Some embodiments of apparatus and/or methods in accordance with embodiments of the present invention are now described, by way of example only, and with reference to the accompanying drawings in which.

In the figures like features are denoted by like reference characters.

DETAILED DESCRIPTION

In 3GPP-compliant networks, data plane traffic is carried over virtual connections called service data flows (SDFs), which are, in turn, carried over IP-CAN bearers—virtual containers with unique QoS characteristics. Multiple SDFs can be carried per IP-CAN bearer. SDFs are also referred to as service flows or IP service flows. Each user equipment (UE) (e.g., a smart phone), requires a connection to the network. This connection to the network is represented as an IP-CAN session. Each IP-CAN session can carry one or more IP-CAN bearers.

Figure 1:
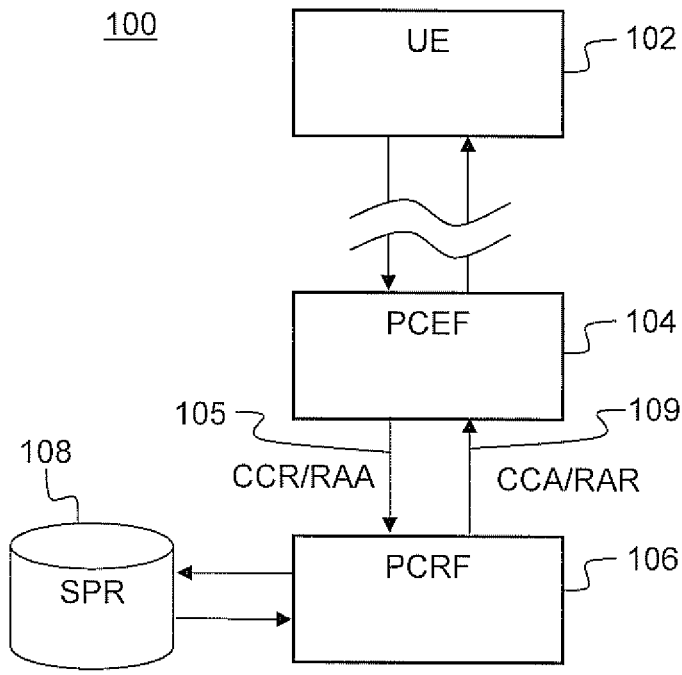
FIG. 1 illustrates a simplified block diagram of an LTE system.

FIG. 1 illustrates a simplified block diagram of an LTE system 100. User Equipment 102 communicates with a PCEF function 104, which can be part of a Packet Data Network-Gateway (PDN-GW) (also referred to as a packet gateway (PGW) node), to initiate a request for service. The PCEF generates a Credit Control Request (CCR) message, such as CCR 105, requesting an appropriate allocation of resources and forwards the request to PCRF node 106. The CCR message to PCRF node 106 includes an EPS-Default-Bearer-QoS Attribute Value Pair (AVP) or QoS-Information AVP containing the requested QoS by the subscriber. PCRF validates the message (its syntax, semantics) and then retrieves subscriber data from Subscription Profile Repository (SPR) 108, to determine if the subscriber is valid, and the subscriber's QCI limit for the QCI software specified in the request. Generally, the SPR 108 stores the following information per subscriber, for non-Guaranteed Bit-Rate (non-GBR) calls: Aggregate Maximum Bit Rate (AMBR); the bandwidth limits for each QCI level; the bandwidth limits for applications such as voice calls, Voice Over IP (VOIP) calls, or for specific applications such as, for example, Skype or Google Talk. The SPR 108 may be a device that stores information related to subscribers to the network 100. Thus, SPR 108 may include a machine-readable storage medium such as read-only memory (ROM), random-access memory (RAM), magnetic disk storage media, optical storage media, flash-memory devices, and/or similar storage media. SPR 108 may be a component of PCRF node 106 or may constitute an independent node within network 100. Data stored by SPR 108 may include an identifier of each subscriber and indications of subscription information for each subscriber such as bandwidth limits, charging parameters, subscriber priority, and subscriber service preferences.

Based on the event type (e.g., IP-CAN Session establishment, AF Session modification, etc.), the PCRF node 106 selects the required rule set type. The PCRF node 106 then returns a Credit Control Answer (CCA) or Re-Authorization Request (RAR) message 109 to the PCEF 104 with the subscriber's QCI limit and authorization to establish the connection. Thus the PCRF node 106 can provide the binding between the IP-CAN/dedicated bearers to the PCC rule name.

In embodiments of the present invention, Authorized QoS per QCI is interpreted to be the total bandwidth allowed for the subscriber for a given QCI. This total bandwidth is then allocated among the active IP-Can bearers within the IP-CAN session of the subscriber, to best accommodate the bandwidth needs of the PCC rules currently bound to those IP-CAN bearers.

Figure 2:
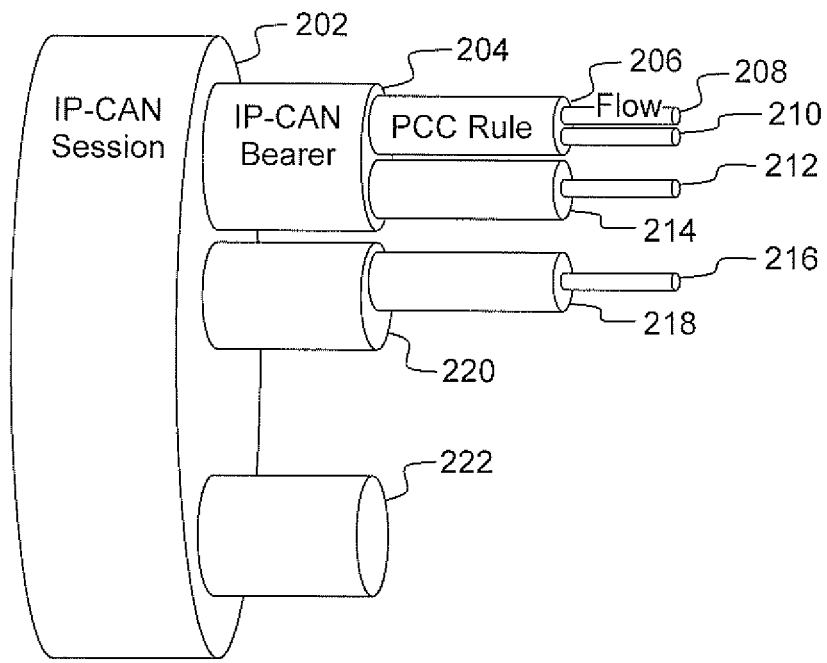
FIG. 2 illustrates elements of an IP-CAN session.

Referring to FIG. 2, IP-Can session 202 defines a communication session established by a subscriber per a given Access Point Name (APN)/Packet Data Protocol (POP) address. The IP-CAN session can support multiple IP-CAN bearers 204, 220, 222 and multiple bearers can have the same QCI. Multiple Service Data Flows (SDF) 208, 210, 212, 216 can be supported by each PCC Rule. SDFs are also referred to as SDF flows, data flows, or "filters". The PCC Rules are in turn bound to the IP-CAN bearers.

Figure 3:
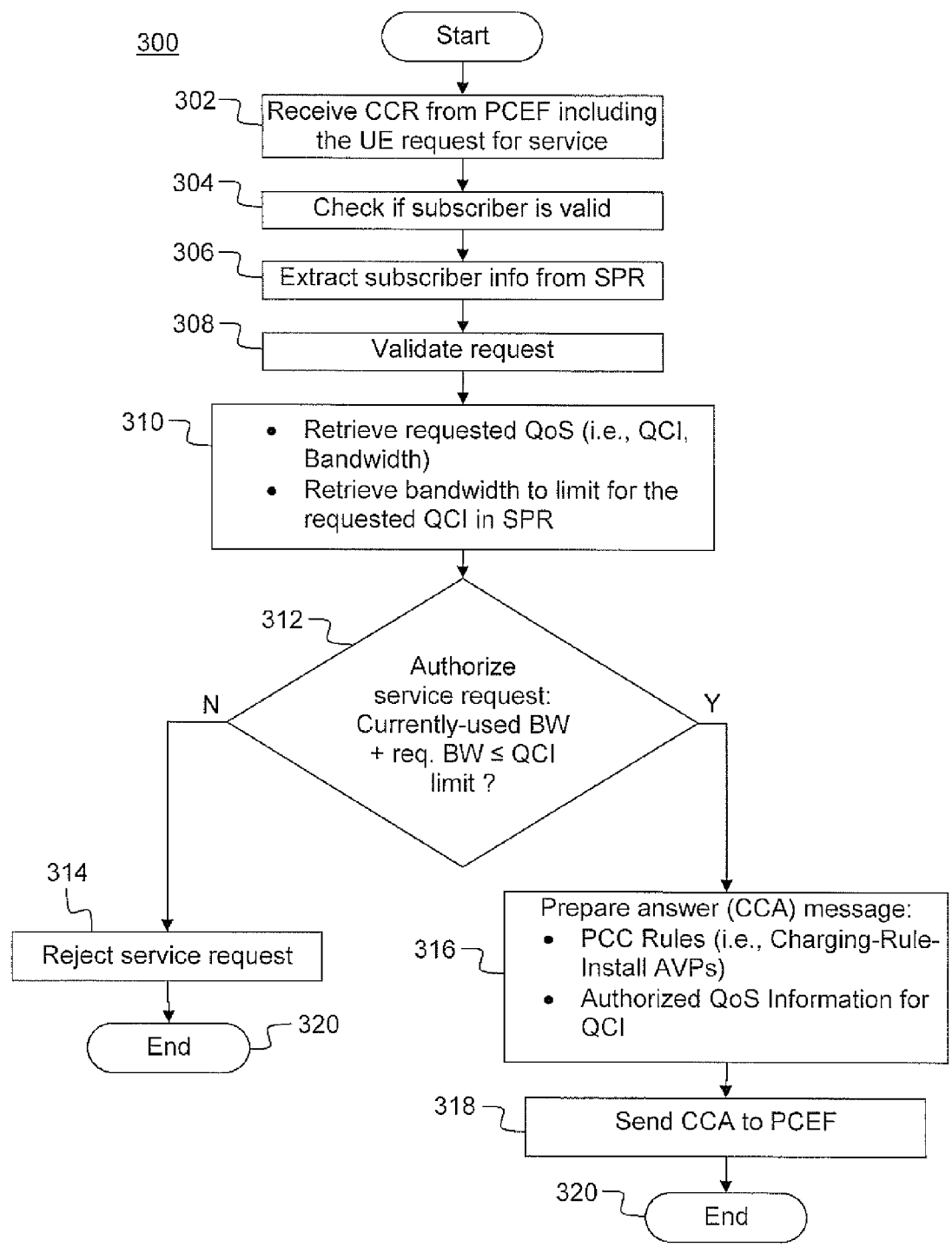
FIG. 3 illustrates a flowchart of a method of the resent invention.

FIG. 3 illustrates a flowchart of a method 300 of an embodiment of the present invention. At step 302, the PCRF 106 receives the CCR message from the PCEF 104 including the subscriber's (or User Equipment (UE)) request for service. At step 304 the PCRF 106 checks if the subscriber is valid. At step 306, the PCRF 106 extracts subscriber data from the SPR. At step 308 the PCRF 106 validates the request. At step 310, the PCRF 106 retrieves the requested QCI and the requested bandwidth from the CCR message and retrieves the bandwidth limit (QoS) for the requested QCI from the SPR.

At step 312, the PCRF 106 authorizes the UE request. The authorization involves determining if the bandwidth that the subscriber is currently using, if any, plus the requested bandwidth in step 302 is within the bandwidth limits set by the operator within the SPR for the subscriber. Further the operator may write local policies (i.e., rules) that influence the authorization (e.g., if "subscriber current location"="downtown" then "Deny YouTube service").

If the PCRF 106 determines that the subscriber's request can be authorized, the process proceeds to step 316, where the PCRF 106 prepares an answer message (i.e., CCA) to be returned to the PCEF 104. This answer message includes the authorized services that were requested by the UE in the form of Charging-Rule-Definition AVPs. Each Charging-Rule-Definition AVP will be encoded within a Charging-Rule-Install AVP and may include one or more Charging-Rule-Definition AVPs. The answer message may further contain one or more Charging-Rule-Install AVPs, rule activation and deactivation time among other parameters. As part of this answer message, the PCRF 106 may include the Authorized QoS per QCI within the QoS-Information AVP. Further, the generation of PCC rule and Authorized QoS may also be triggered due to an AF request within an AAR message. The authorization of the AF requests is similar to the authorization and PCC rule generation based on the UE request.

At step 318, the PCRF sends the CCA message to the PCEF and then the process ends at step 320.

If at step 312, the PCRF 106 determines that the bandwidth will exceed the QCI limit, then at step 314, the PCRF 106 rejects the service request by sending the appropriate CCA message to the PCEF 104.

Figures 4A, 4B, 4C:
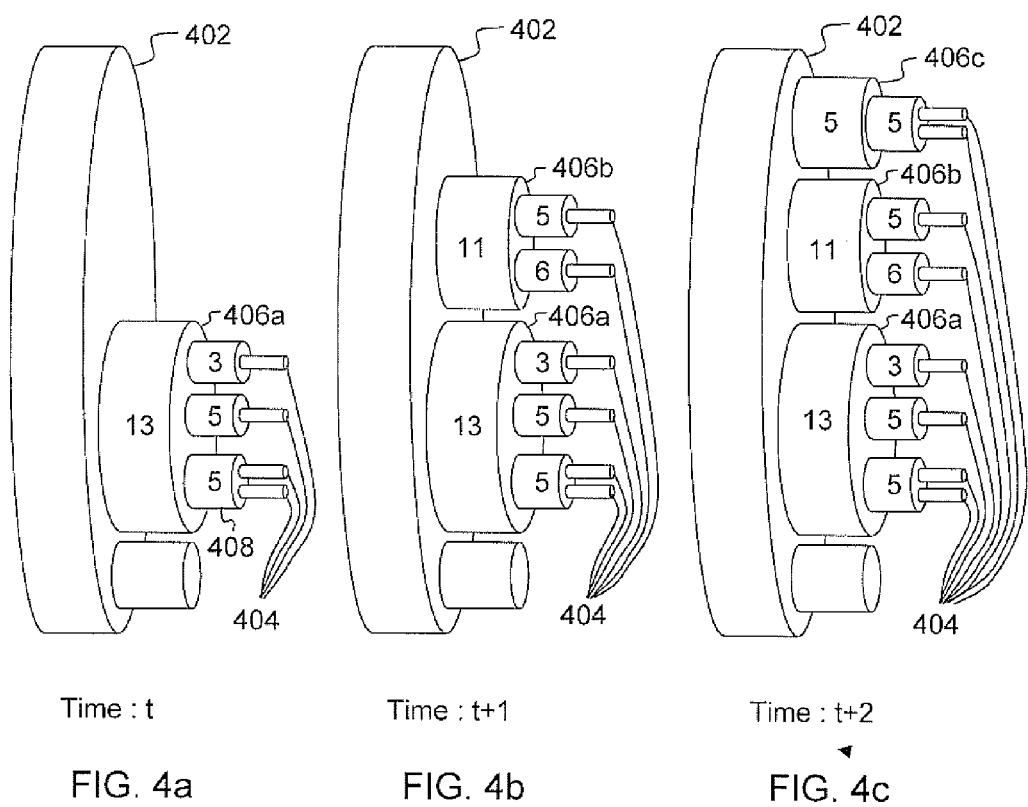
FIGS. 4a, 4b, 4c illustrate a scenario of IP service flows added over time.

Referring to FIGS. 4a, 4b, 4c, a subscriber with IP-CAN session 402 has several IP service flows 404, established over time (t, t+1, t+2), distributed over three IP-CAN bearers 406a, 406b, 406c. The number on each PCC rule 408 represents the bandwidth (in Mbps) consumed by the service flows 404 that each PCC rule represents. The number on each IP-CAN bearer 406a, 406b, 406c represents its bandwidth capacity (in Mbps). Each of these IP-CAN bearers 406a, 406b, 406c belong to the same QCI=6.

Figures 5, 6:
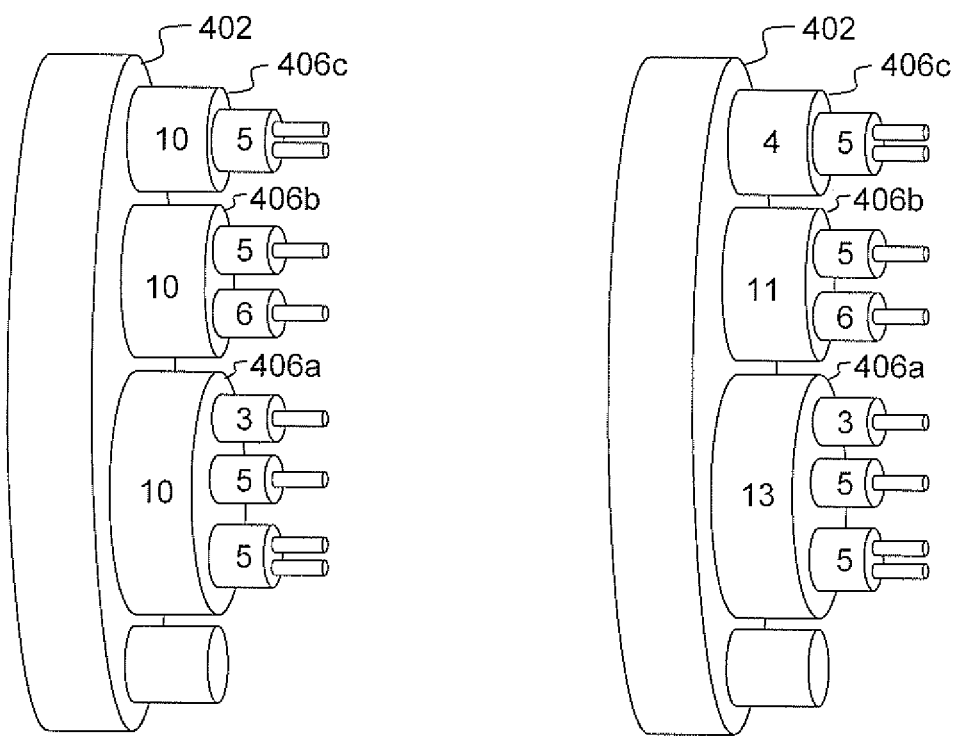
FIG. 5 illustrates a prior art scenario of provisioning Authorized QoS per QCI per 3GPP specifications.
FIG. 6 illustrates a scenario of provisioning Authorized QoS per QCI per an embodiment of the present invention.

FIG. 5, illustrates a scenario per a prior art embodiment of inefficient IP-CAN bearer bandwidth usage as a result of using Authorized QoS per QCI policy per 3GPP specifications. For example, at time t+3, the PCRF provisions an Authorized QoS per QCI of 10 Mbps for QCI=6. As per 3GPP specifications, the PCEF is expected to apply this Authorized QoS per QCI to all the IP-CAN bearers (406a, 406b, 406c) active within the IP-CAN session 402 at that time. The provisioned Authorized QoS per QCI causes inefficiencies as the PCC rules in IP-CAN bearers 406a and 406b have insufficient bandwidth to carry the PCC rules while IP-CAN bearer 406c has more bandwidth than the PCC rule in it requires.

FIG. 6, illustrates a scenario per an embodiment of the present invention. In this scenario, the Authorized QoS per QCI is interpreted as the total bandwidth allowed for the subscriber. For example, at time 't+3', the PCRF 106 provisions an Authorized QoS per QCI of 28 Mbps for QCI=6. As per this embodiment of the present invention, the PCEF 104 can distribute this Authorized QoS per QCI among all the IP-CAN bearers (406a, 406b, 406c) with QCI=6 active within the IP-CAN session 402 at that time. This method of provisioned Authorized QoS per QCI gives flexibility to the PCEF to distribute the allocation of bandwidth among the IP-CAN bearers so each of the IP-CAN bearers can best accommodate the bandwidth needs of the PCC rules in it. Using the method suggested by this embodiment of the present invention has resulted in only one IP-CAN bearer (406c) with bandwidth less than the required by the PCC rules within that IP-CAN bearer. The distribution of the bandwidth among the IP-CAN bearers can further be extended, for example, based on the priority or the type of service the PCC rule(s) are providing.

A person of skill in the art would readily recognize that steps of various above-described methods can be performed by programmed computers. Herein, some embodiments are also intended to cover program storage devices, e.g., digital data storage media, which are machine or computer-readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the Figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Numerous modifications, variations and adaptations may be made to the embodiment of the invention described above without departing from the scope of the invention, which is defined in the claims.

What is claimed is:

1. A method of providing an Authorized Quality-of-Service (QoS) per QoS Class Identifier (QCI), the method comprising steps of:
   receiving a service request for a subscriber, said service request comprising a requested bandwidth and a requested QCI;
   retrieving from a Subscription Profile Repository (SPR), a subscriber profile for said subscriber;
   extracting a QCI limit for the requested QCI from said subscriber profile, wherein said QCI limit is applicable to a plurality of Internet Protocol Connectivity Access Network (IP-CAN) bearers with the QCI within an IP-CAN session of said subscriber;

determining if currently-used bandwidth for the IP-CAN bearers with the QCI within the IP-CAN session of said subscriber plus said requested bandwidth is less than or equal to said QCI limit; and responsive to said determining step, provisioning said QCI limit as the authorized QoS per QCI.

2. The method of claim 1, wherein said authorized QoS per QCI is communicated to a Policy and Charging Enforcement Function (PCEF).

3. The method of claim 2, wherein the PCEF may allocate required resources among the Internet Protocol Connectivity Access Network (IP-CAN) bearers within an IP-CAN session of the subscriber to provide the authorized QoS.

4. The method of claim 3, further comprising a step of installing one or more charging rules within said IP-CAN session.

5. The method of claim 2, further comprising a step of sending a Credit Control Answer (CCA) message in response to said service request.

6. The method of claim 5 wherein said service request for a subscriber is received in the form of a Credit Control Request (CCR) message.

7. The method of claim 6, wherein said method is performed at a Policy and Charging Rules Function (PCRF) node.

8. The method of claim 7, wherein said PCRF node is a node or nodes providing PCRF functionality.

9. The method of claim 7, wherein said PCRF node comprises an element in a 3GPP-compliant packet data network.

10. The method of claim 9, wherein said 3GPP-compliant packet data network comprises a Long Term Evolution (LTE) or General Packet Radio Service (GPRS) network.

11. The method of claim 2, further comprising a step of sending a Re-Authorization Request (RAR) message due to a PCRF internal trigger or service request from an Application Function (AF).

12. The method of claim 1, wherein the step of provisioning authorized QoS per QCI as the QCI limit comprises including the QoS per QCI within a QoS-Information AVP.

13. The method of claim 12, wherein the QoS-Information AVP is outside of any Charging-Rule-Install AVP.

14. The method of claim 1, further comprising rejecting the service request if the currently-used bandwidth for active IP-Can bearers within the IP-CAN session of said subscriber plus said requested bandwidth is more than said QCI limit.

15. A Policy and Charging Rules Function (PCRF) Node for generating Policy and Control Charging PCC rules, the PCRF node configured to:

receive a service request for a subscriber, said service request comprising a requested bandwidth and a requested Quality of Service (QoS) class identifier (QCI);

retrieve from a Subscription Profile Repository (SPR), a subscriber profile for said subscriber;

extract a QCI limit for the requested QCI from said subscriber profile, wherein said QCI limit is applicable to a plurality of Internet Protocol Connectivity Access Network (IP-CAN) bearers with the QCI within an IP-CAN session of said subscriber;

determine if currently-used bandwidth for the IP-CAN bearers with the QCI within the IP-CAN session of said subscriber plus said requested bandwidth is less than said QCI limit; and responsive to said determining step, provision said QCI limit as an authorized QoS per QCI.

16. A non-transitory machine-readable storage medium encoded with instructions for a policy and rules charging function (PCRN) node, the non-transitory machine-readable storage medium comprising:

instructions for receiving a service request for a subscriber, said service request comprising a requested bandwidth and a requested Quality of Service (QoS) class identifier (QCI);

instructions for retrieving from a Subscription Profile Repository (SPR), a subscriber profile for said subscriber;

instructions for extracting a QCI limit for the requested QCI from said subscriber profile, wherein said QCI limit is applicable to a plurality of Internet Protocol Connectivity Access Network (IP-CAN) bearers with the QCI within an IP-CAN session of said subscriber;

instructions for determining if currently-used bandwidth for the IP-CAN bearers with the QCI within the IP-CAN session of said subscriber plus said requested bandwidth is less than said QCI limit; and instructions for, responsive to said determining step, provisioning said QCI limit as an authorized QoS per QCI.

* * * * *